United States Patent
Wan et al.

(10) Patent No.: US 8,502,515 B1
(45) Date of Patent: Aug. 6, 2013

(54) MULTIPHASE DC-DC CONVERTING CIRCUIT AND CONTROL CIRCUIT THEREOF

(71) Applicant: Richtek Technology Corporation, Zhubei (TW)

(72) Inventors: Yi-Cheng Wan, Taoyuan (TW); Jian-Rong Huang, Hsinchu (TW); Hung-Chun Peng, Taichung (TW)

(73) Assignee: Richtek Technology Corporation, Zhubei, Hsinchu County (TW)

( * ) Notice: Subject to any disclaimer, the term of this patent is extended or adjusted under 35 U.S.C. 154(b) by 0 days.

(21) Appl. No.: 13/777,869

(22) Filed: Feb. 26, 2013

(30) Foreign Application Priority Data

Apr. 16, 2012 (TW) .............................. 101207028 U

(51) Int. Cl.
G05F 1/40 (2006.01)
(52) U.S. Cl.
USPC ............................ 323/282; 323/272; 323/285
(58) Field of Classification Search
USPC ................. 323/237–246, 271, 272, 282–285, 323/351
See application file for complete search history.

(56) References Cited

U.S. PATENT DOCUMENTS

| | | | |
|---|---|---|---|
| 6,683,441 B2 | 1/2004 | Schiff et al. | |
| 7,064,528 B2 | 6/2006 | Jochum et al. | |
| 7,888,918 B2* | 2/2011 | Wu et al. | 323/224 |
| 7,928,704 B2 | 4/2011 | Huang | |
| 7,960,957 B2* | 6/2011 | Clavette et al. | 323/284 |
| 2009/0051334 A1 | 2/2009 | Huang | |
| 2013/0015830 A1* | 1/2013 | Zhang | 323/282 |

* cited by examiner

*Primary Examiner* — Jessica Han
(74) *Attorney, Agent, or Firm* — Birch, Stewart, Kolasch & Birch, LLP

(57) ABSTRACT

A multiphase DC-DC converting circuit for providing power to a load is disclosed, having power stage circuits, channel current converting circuits, current detecting circuits, a transconductance amplifier circuit, a comparator circuit, and a channel current balance circuit. The current detecting circuits detect current signals of current channels, and the transconductance amplifier circuit and the comparator circuit are coupled with the current detecting circuits to receive the voltage difference across a resistor, and to generate a total current detecting signal provided to the load. The channel current converting circuit is coupled with the current detecting circuits to generate channel current detecting signals. The channel current balance circuit is coupled with the comparator circuit, the transconductance amplifier circuit and the channel current converting circuit to balance the current signals of the current channels.

16 Claims, 4 Drawing Sheets

MULTIPHASE DC-DC CONVERTING CIRCUIT AND CONTROL CIRCUIT THEREOF

CROSS-REFERENCE TO RELATED APPLICATIONS

This application claims the benefit of priority to Patent Application No. 101207028, filed in Taiwan on Apr. 16, 2012; the entirety of which is incorporated herein by reference for all purposes.

BACKGROUND

The disclosure generally relates to a DC-DC converting circuit and, more particularly, to a multiphase DC-DC converting circuit and control circuit thereof.

A multiphase DC-DC converting circuit comprises a plurality of current channels for providing power to a load. The multiphase DC-DC converting circuit may not only provide a sufficient current for a rapidly varying load, but also possess the advantage of low ripples in the provided current. Therefore, the multiphase DC-DC converting circuits are widely adopted in a variety of applications.

In the multiphase DC-DC converting circuit, however, the control circuit of the multiphase DC-DC converting circuit should know the current of each current channels and the total current provided to the load so as to provide power to the load more equally with the current channels, to perform the over-current protection function, to ensure the normal operation of the multiphase DC-DC converting circuit, etc.

In U.S. Pat. Nos. 6,683,441, 7,064,528 and 7,928,704, several circuit architectures are proposed to detect the total current which the multiphase DC-DC converting circuit provides to the load. These circuit architectures comprises resistors, capacitors, amplifiers, and other circuit elements for generating a signal proportional to the total current which the multiphase DC-DC converting circuit provides to the load. There are, however, many restrictions on choosing the impedances of these circuit elements, and the design flexibility is limited. Besides, in some circuit architectures, the current detecting signals of the current channels are coupled with the non-inverting input of the amplifier. Because the impedance of the non-inverting input of the amplifier is very high, the currents may not flow into the non-inverting input of the amplifier. Moreover, there is no other current path at the non-inverting input of the amplifier. In these situations, the circuit design is more complicated and the hardware complexity is increased.

In the above circuit architectures, when the control circuit of the multiphase DC-DC converting circuit detects the total current provided to the load, the current detecting signals of the current channels flow through circuit elements. The temperatures of the circuit elements increase and accordingly the impedances of the circuit elements vary so that the detected signal may not be accurate. Thus, complicated temperature compensation mechanisms should be adopted to ensure the accuracy of the detected signal.

SUMMARY

In view of the foregoing, it is appreciated that a substantial need exists for apparatuses that may mitigate or reduce the problem above.

An example embodiment of a multiphase DC-DC converting circuit for providing power to a load is disclosed, comprising: a plurality of power stage circuits, each of which comprises an upper transistor, a lower transistor, and an output for coupling with the load through an inductor; a first transconductance amplifier circuit, comprising a non-inverting input and an inverting input respectively coupled with two terminals of a detecting resistor; a comparator circuit, comprising a non-inverting input for coupling with the load, an inverting input coupled with the non-inverting input of the first trans-conductance amplifier circuit, and an output coupled with the inverting input of the first transconductance amplifier circuit; a plurality of current detecting circuits, each of which comprises a first resistor, a second resistor and a capacitor, wherein a first terminal of the first resistor is coupled with the output of one of the power stage circuits, a second terminal of the first resistor is coupled with a first terminal of the capacitor and a first terminal of the second resistor, a second terminal of the capacitor is for coupling with the load, and a second terminal of the second resistor is coupled with the inverting input of the comparator circuit; a plurality of channel current converting circuits, each of which comprises an input for coupling with the load, the second terminal of the first resistor of one of the current detecting circuits, the first terminal of the capacitor of one of the current detecting circuits, and the first terminal of the second resistor of one of the current detecting circuits; and a channel current balance circuit, comprising an input coupled with an output of the first transconductance amplifier circuit and outputs of the channel current converting circuits, and comprising an output coupled with the power stage circuits for configuring the upper transistors and the lower transistors of the power stage circuits.

Another example embodiment of a control circuit of a multiphase DC-DC converting circuit for configuring the multiphase DC-DC converting circuit to provide power to a load is disclosed; the multiphase DC-DC converting circuit comprises a detecting resistor, a plurality of power stage circuits and a plurality of current detecting circuits; each of the power stage circuits comprises an output for coupling with the load through an inductor; each of the current detecting circuits comprises a first resistor, a second resistor and a capacitor, wherein a first terminal of the first resistor is coupled with the output of one of the power stage circuits, a second terminal of the first resistor is coupled with a first terminal of the capacitor and a first terminal of the second resistor, a second terminal of the capacitor is for coupling with the load, and a second terminal of the second resistor is coupled with the control circuit; the control circuit comprises: a first transconductance amplifier circuit, comprising a non-inverting input, an inverting input, and an output; a comparator circuit, comprising a non-inverting input for coupling with the load, an inverting input coupled with the non-inverting input of the first trans-conductance amplifier circuit and the second terminal of the second resistors of the current detecting circuits, and an output coupled with the inverting input of the first trans-conductance amplifier circuit; a plurality of channel current converting circuits, each of which comprises an input for coupling with the load, the second terminal of the first resistor of one of the current detecting circuits, the first terminal of the capacitor of one of the current detecting circuits, and the first terminal of the second resistor of one of the current detecting circuits; and a channel current balance circuit, comprising an input coupled with the output of the first transconductance amplifier circuit and outputs of the channel current converting circuits, and comprising an output coupled with the power stage circuits for configuring the power stage circuits, wherein two terminals of the detecting resistor are respectively coupled with the non-inverting input and the inverting input of the first transconductance amplifier circuit.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
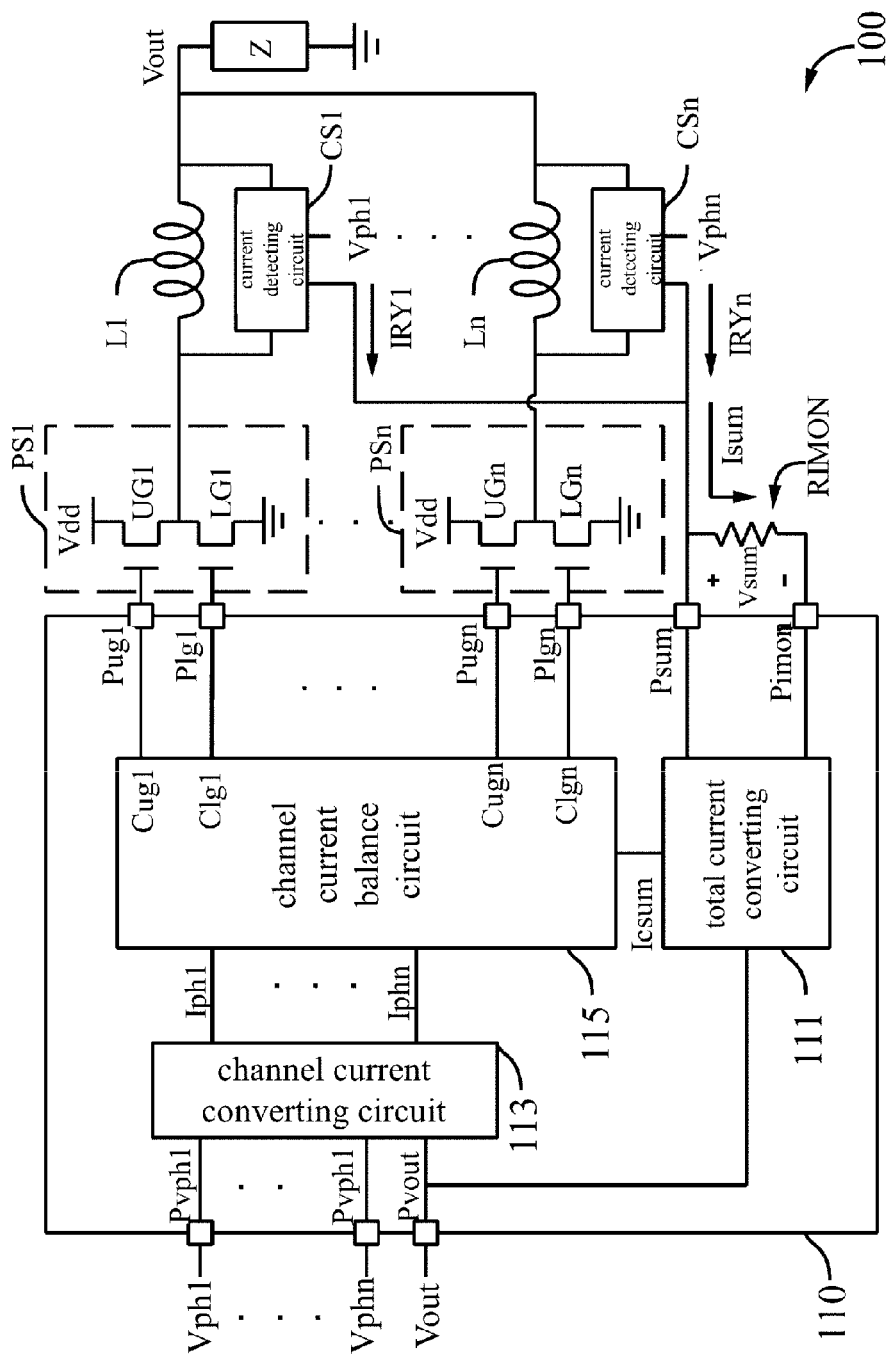
FIG. 1 shows a simplified functional block diagram of a multiphase DC-DC converting circuit according to one embodiment of the present disclosure.

FIG. 1 shows a simplified functional block diagram of a multiphase DC-DC converting circuit 100 according to one embodiment of the present disclosure. The multiphase DC-DC converting circuit 100 comprises n current channels for providing power to a load Z, i.e., the multiphase DC-DC converting circuit 100 is an n-phase DC-DC converting circuit. The multiphase DC-DC converting circuit 100 comprises a control circuit 110, n power stage circuits PS1~PSn (only PS1 and PSn are shown in FIG. 1), n inductors L1~Ln (only L1 and Ln are shown in FIG. 1), n current detecting circuits CS1~CSn (only CS1 and CSn are shown in FIG. 1), and a resistor RIMON (also known as the detecting resistor).

Some elements, pins, and signals are not shown in FIG. 1 for the purposes of conciseness and clearer explanation. For example, the power stages PS2~PSn-1, the inductors L2~Ln-1, the current detecting circuits CS2~CSn-1 and the corresponding connections are not shown in FIG. 1. Moreover, the connections between channel current detecting signals Vph1~Vphn of the current detecting circuits CS1~CSn and pins Pvph1~Pvphn of the control circuit 110 are not shown in FIG. 1. The connection between an output voltage Vout of the multiphase DC-DC converting circuit 100 provided to the load Z and a pin Pvout of the control circuit 110 is also not shown in FIG. 1.

The control circuit 110 comprises a total current converting circuit 111, a channel current converting circuit 113, and a channel current balance circuit 115. In this embodiment, the control circuit 110 is realized with an integrated circuit, and the integrated circuit packaging of the control circuit 110 comprises the pins Pvout, Pvph1~Pvphn, Pug1~Pugn, Plg1~Plgn, Psum and Pimon.

Current signals IRY1~IRYn generated by the current detecting circuits CS1~CSn form a total current signal Isum, which flows through the resistor RIMON to generate a corresponding voltage signal Vsum.

The total current converting circuit 111 generates a total current detecting signal Icsum according to the output voltage Vout received from the pin Pvout and according to the voltage signal Vsum between two terminals of the resistor RIMON received from the pin Psum and the pin Pimon. The total current detecting signal Icsum is proportional to the total current that the multiphase DC-DC converting circuit 100 provides to the load Z. The total current detecting signal Icsum is transmitted to the channel current balance circuit 115.

The channel current converting circuit 113 generates channel current detecting signals Iph1~Iphn according to the output voltage Vout received from the pin Pvout and the channel current detecting signals Vph1~Vphn respectively received from the pins Pvph1~Pvphn. The generated channel current detecting signals Iph1~Iphn are transmitted to the channel current balance circuit 115.

The channel current balance circuit 115 generates control signals Cug1~Cugn and control signals Clg1~Clgn respectively for the power stage circuits PS1~PSn according to the channel current detecting signals Iph1~Iphn and the total current detecting signal Icsum. For example, the channel current balance circuit 115 generates pulse width modulated signals to be the control signals Cugn and Clgn for the power stage circuit PSn.

In this embodiment, each of the power stage circuits PS1~PSn comprises two transistors respectively configured by the corresponding one of the control signals Cug1~Cugn and the corresponding one of the control signals Clg1~Clgn. Each of the power stage circuits PS1~PSn comprises an output for providing the required voltage signal and/or the required current signal to the load Z respectively through the corresponding one of the inductors L1~Ln. For example, the power stage circuit PSn of the nth current channel comprises an upper transistor UGn and a lower transistor LGn, coupled between a voltage level Vdd and the ground and configured by the control signals Cugn and Clgn provided by the channel current balance circuit 115 through the pins Pugn and Plgn. Therefore, the transistors UGn and LGn may be conducted at the appropriated time so that the power stage circuit PSn may provide the required voltage signal and/or the required current signal to the load Z through the inductor Ln.

The current detecting circuits CS1~CSn are respectively coupled with two terminals of the inductors L1~Ln to detect the channel current signals flow through the inductors L1~Ln, and to generate the current signals IRY1~IRYn and the channel current detecting signals Vph1~Vphn. For example, in the nth current channel, a terminal of the current detecting circuit CSn is coupled with one terminal of the inductor Ln and the power stage circuit PSn, and the other terminal of the current detecting circuit CSn is coupled with the other terminal of the inductor Ln and the load Z to generate the current signal IRYn and the channel current detecting signal Vphn.

Figure 2:
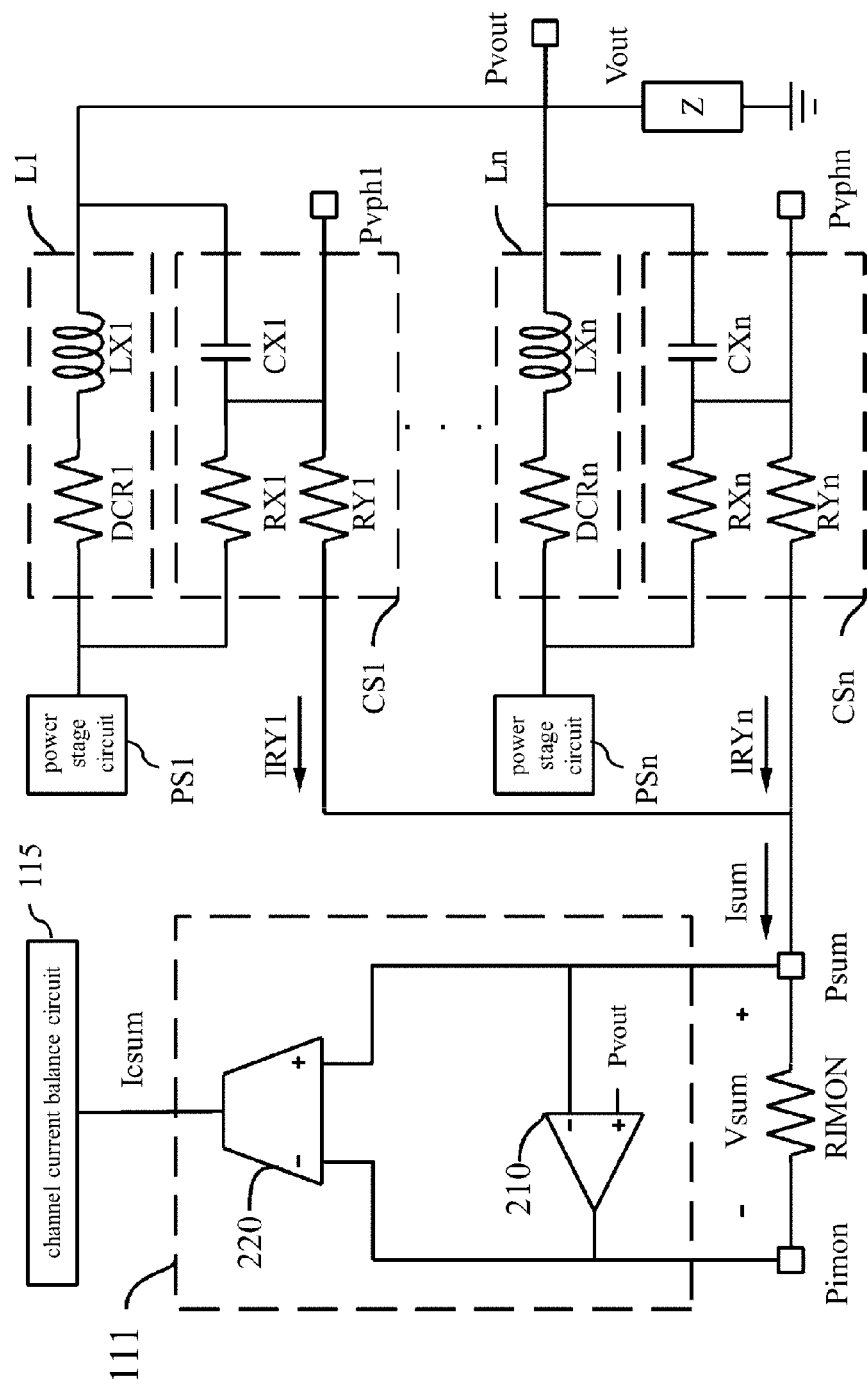
FIG. 2 shows a simplified functional block diagram of the current detecting circuit and the total current converting circuit of the multiphase DC-DC converting circuit in FIG. 1 according to one embodiment of the present disclosure.

FIG. 2 shows a simplified functional block diagram of the current detecting circuits CS1~CSn and the total current converting circuit 111 of the multiphase DC-DC converting circuit 100 according to one embodiment of the present disclosure. Some elements, pins, and signals are not shown in FIG. 2 for the purposes of conciseness and clearer explanation. For example, the current detecting circuits CS2~CSn-1, and the connection between the total current converting circuit 111 and the pin Pvout are not shown in FIG. 2.

The first terminals of the inductors L1~Ln are respectively coupled with the outputs of the power stage circuits PS1~PSn, and the second terminals of the inductors L1~Ln are coupled with the load Z. In this embodiment, the inductors L1~Ln are respectively illustrated with serially coupled equivalent resistances DCR1~DRCn and equivalent inductances LX1~LXn for clearer explanation. For example, the inductor Ln of the nth current channel is illustrated with an equivalent resistance DCRn and an equivalent inductance LXn, and the first terminal of the inductor Ln is coupled with the output of the power stage circuit PSn and the second terminal of the inductor Ln is for coupling with the load Z.

In this embodiment, each of the current detecting circuits CS1~CSn comprises two resistors and a capacitor coupled in the same configuration. As shown in FIG. 2, the current detecting circuit CSn of the nth current channel comprises a resistor RXn (also known as a first resistor), a resistor RYn (also known as a second resistor) and a capacitor CXn. A first terminal of the resistor RXn is coupled with the first terminal of the inductor Ln and the output of the power stage circuit PSn, and a second terminal of the resistor RXn is coupled with a first terminal of the capacitor CXn, a first terminal of the resistor RYn and the pin Pvphn. A second terminal of the capacitor CXn is coupled with the second terminal of the inductor Ln and the load Z. A second terminal of the resistor RYn is coupled with the pin Psum.

In this embodiment, the total current converting circuit 111 comprises a comparator circuit 210 and a transconductance amplifier circuit 220 (also known as a first transconductance amplifier circuit). The comparator circuit 210 comprises a non-inverting input coupled with the pin Pvout to receive the output voltage Vout, an inverting input coupled with the pin Psum, the first terminal of the resistor RIMON, the second terminals of the resistors RY1~RYn of the current detecting circuits CS1~CSn, and a non-inverting input of the transconductance amplifier circuit 220. The comparator circuit 210 comprises an output coupled with the pin Pimon, the second terminal of the resistor RIMON, and an inverting input of the transconductance amplifier circuit 220. The trans-conductance amplifier circuit 220 generates the total current detecting signal Icsum according to the voltage signal Vsum between the non-inverting input and the inverting input of the transconductance amplifier circuit 220 and transmits the total current detecting signal Icsum to the channel current balance circuit 115.

In the nth current channel, the voltage difference between the pin Pvphn and the pin Pvout is expressed by Vxn, i.e., the voltage difference of the two terminals of the capacitor CXn is expressed by Vxn. The non-inverting input and the inverting input of the comparator circuit 210 are virtually short so that the voltage at the pin Psum is virtually equal to the voltage at the pin Pvout, and therefore the voltage difference between the two terminals of the resistor RYn is also Vxn. The currents flow through the inductor Ln, the resistor RXn, the capacitor CXn and the resistor RYn are respectively expressed by ILn, IRXn, ICXn and IRYn, and the impedances of the capacitor CXn, the resistors RXn and RYn are expressed by cxn, rxn and ryn.

The voltage difference between the two terminals of the inductor Ln is equal to the voltage difference between the two terminals of the resistor RXn plus the voltage difference between the two terminals of the capacitor CXn, i.e., $ILn*(DCRn+S*LXn)=IRXn*rxn+Vxn$, wherein $S=j\cdot\omega$. The currents flow through the resistor RXn, the capacitor CXn and the resistor RYn are respectively expressed by $IRXn=(ILn*DCRn+ILn*S*LXn-Vxn)/rxn$, $ICXn=Vxn*S*cxn$, and RYn is $IRYn=Vxn/ryn$. According to the Kirchhoff circuit laws, $IRXn=ICXn+IRYn$, and $(ILn*DCRn+ILn*S*LXn-Vxn)/rxn=Vxn*S*cxn+Vxn/ryn$. The signals Vxn and IRYn are therefore expressed by $Vxn=[(DCRn+S*LXn)/(1+rxn/ryn+S*cxn*rxn)]*ILn$ and $IRYn=[(DCRn+S*LXn)/(rxn+ryn+S*cxn*rxn*ryn)]*ILn$.

By configuring the equivalent resistance DCRn and the equivalent inductance LXn of the inductor Ln to be $DCRn=Kn*(rxn+ryn)$ and $LXn=Kn*cxn*rxn*ryn$, the term $Kn=DCRn/(rxn+ryn)$ is a constant. The S term in the above equations may be cancelled so that the signals VXn and IRYn are not influenced by the frequency. The current signal IRYn generated by the current detecting circuit CSn is expressed by $IRYn=[DCR/(rxn+ryn)]*ILn=Kn*ILn$, and the voltage difference between the pin Pvphn and the pin Pvout is expressed by $Vxn=[DCRn*ryn/(rxn+ryn)]*ILn=Kn*ryn*ILn$. Thus, IRYn and Vxn are respectively equal to the current signal ILn of the nth current channel multiplied by constants.

The total current signal Isum is formed by the summation of the current signals IRY1~IRYn respectively generated by the current detecting circuits CS1~CSn. Similar to the deduction above, the total current signal may be expressed by $Isum=IRY1+IRY2 \ldots +IRYn=K1*IL1+K2*IL2 \ldots + Kn*ILn$. In this embodiment, by configuring the resistances $DCR1=DCR2 \ldots =DCRn$, the inductances $LX1=LX2 \ldots = LXn$, the capacitances $CX1=CX2 \ldots =CXn$, the resistances $rx1=rx2 \ldots =rxn$, and the resistances $ry1=ry2 \ldots =ryn$, the constants K1~Kn may be expressed by $K1=K2 \ldots =Kn=K$. The total current signal Isum is the summation of all the current signals provided by the current channels multiplied by a constant K, i.e., $Isum=K*(IL1+IL2 \ldots +IL)$.

The resistance of the resistor RIMON is expressed by rimon, and therefore the voltage difference between the pin Psum and the pin Pimon is the summation of the current signals provided by the current channels multiplied by the constant K and the resistance rimon, i.e., $Vsum=Isum*rimon=K*(IL1+IL2 \ldots +IL)*rimon$. The voltage signal Vsum is also the voltage difference between the non-inverting input and the inverting input of the transconductance amplifier circuit 220. When the transconductance of the transconductance amplifier circuit 220 is expressed by Gm220, the transconductance amplifier circuit 220 generates the total current detecting signal Icsum (in the current form) according to the voltage signal Vsum, i.e., $Icsum=Gm220*Vsum$. The total current detecting signal Icsum is transmitted to the channel current balance circuit 115.

Figure 3:
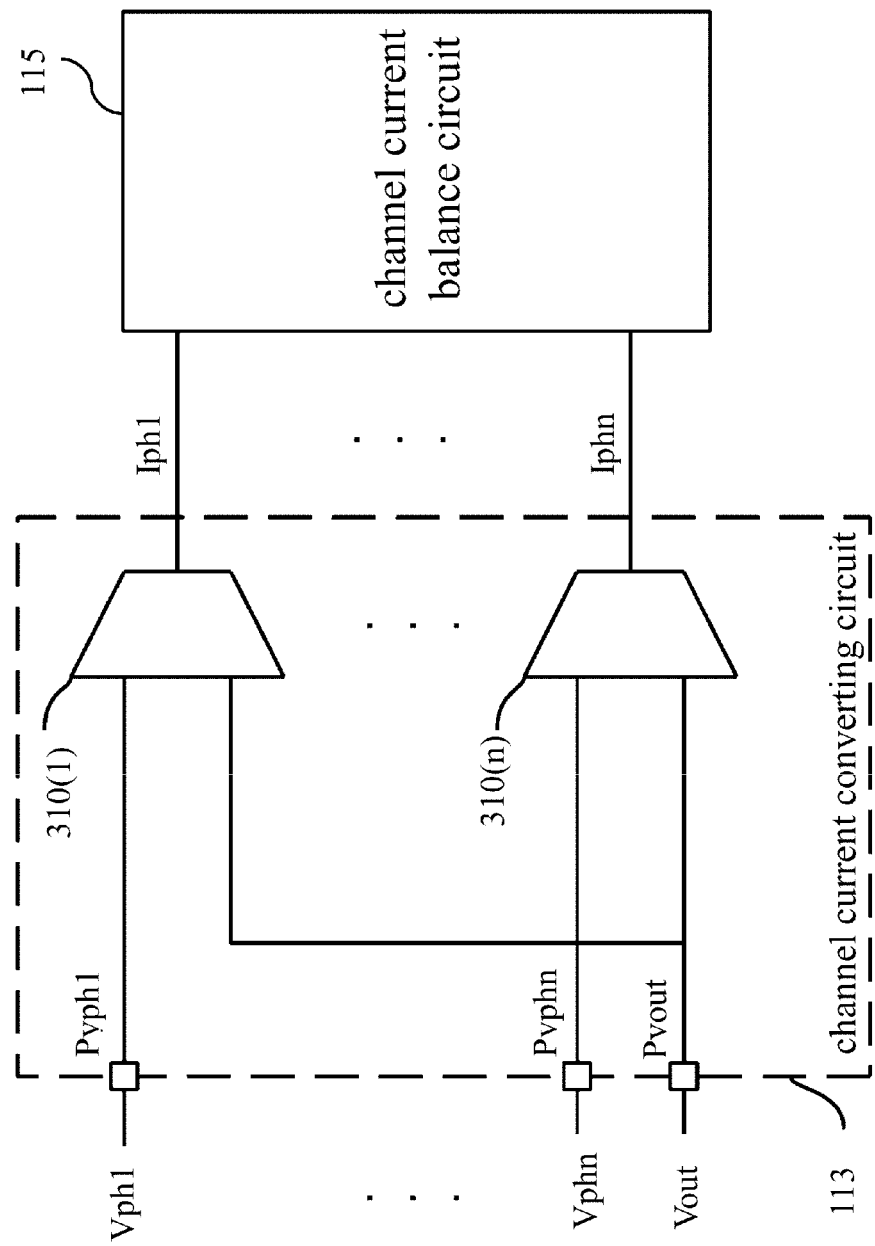
FIG. 3 shows a simplified functional block diagram of the channel current converting circuit of the multiphase DC-DC converting circuit in FIG. 1 according to one embodiment of the present disclosure.

FIG. 3 shows a simplified functional block diagram of the channel current converting circuit 113 of the multiphase DC-DC converting circuit 100 according to one embodiment of the present disclosure. Some elements, pins, and signals are not shown in FIG. 3 for the purposes of conciseness and clearer explanation. For example, trans-conductance amplifier circuits 310(2)~310(n−1) are not shown in FIG. 3.

In this embodiment, the channel current converting circuit 113 comprises n transconductance amplifier circuits 310(1)~310(n) (also known as second transconductance amplifier circuits 310(1)~310(n)), each of the transconductance amplifier circuits 310(1)~310(n) comprises a first input coupled with the pin Pvout and a second input coupled with one of the pins Pvph1~Pvphn for generating the channel current detecting signals Iph1~Iphn (in the current form). The channel current detecting signals Iph1~Iphn are transmitted to the channel current balance circuit 115. For example, the first input of the transconductance amplifier circuit 310(1) is coupled with the pin Pvout to receive the output voltage Vout, and the second input of the transconductance amplifier circuit 310(1) is coupled with the pin Pvphn to receive the nth channel current detecting signal Vphn. As mentioned above, the voltage difference between the first input and the second input of the transconductance amplifier circuit 310(n) is equal to the current signal ILn of the nth current channel multiplied by a constant $Kn*ryn$, i.e., $Vxn=[DCRn*ryn/(rxn+ryn)]*ILn=Kn*ryn*ILn$. When the transconductance of the transconductance amplifier circuit 310(n) is expressed by Gm310

($n$), the transconductance amplifier circuit $310(n)$ generates the channel current detecting signal Iphn (in the current form) according to the voltage difference Vxn, which may be expressed by Iphn=Gm$310$*Vxn. The channel current detecting signal Iphn is transmitted to the channel current balance circuit 115.

In this embodiment, by configuring the resistances DCR1=DCR2 . . . =DCRn, the inductances LX1=LX2 . . . =LXn, the capacitances CX1=CX2 . . . =CXn, the resistances rx1=rx2 . . . =rxn, and the resistances ry1=ry2 . . . =ryn, the constants K1~Kn may be expressed by K1=K2 . . . =Kn=K. The transconductance amplifier circuits $310(1)$~$310(n)$ respectively generate the channel current detecting signals Iph1~Iphn according to the voltage differences Vx1~Vxn, wherein Vx1=K*ry*IL1, Vx2=K*ry*IL2 . . . and Vxn=K*ry*ILn, and Iph1=Gm$310(1)$*Vx1, Gm$310(2)$*Vx2, . . . and Iphn=Gm$310(n)$*Vxn. The channel current detecting signals Iph1~Iphn are transmitted to the channel current balance circuit 115.

Figure 4:
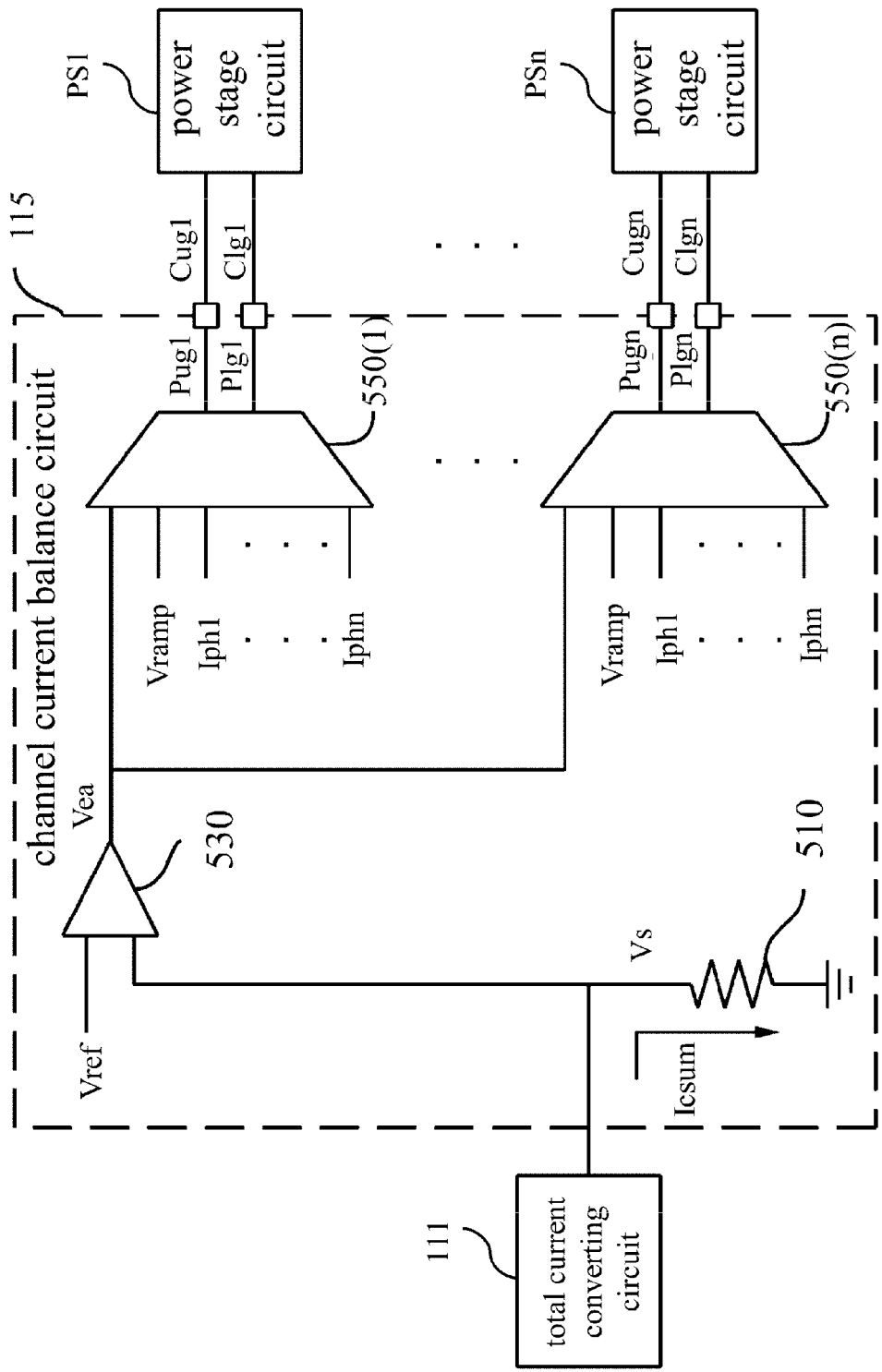
FIG. 4 shows a simplified functional block diagram of the channel current balance circuit of the multiphase DC-DC converting circuit in FIG. 1 according to one embodiment of the present disclosure.

FIG. 4 shows a simplified functional block diagram of the channel current balance circuit 115 of the multiphase DC-DC converting circuit 100 according to one embodiment of the present disclosure. Some elements, pins, and signals are not shown in FIG. 4 for the purposes of conciseness and clearer explanation.

The channel current balance circuit 115 may adopt any suitable algorithms to generate the control signals Cug1~Cugn and Clg1~Clgn for configuring the power stage circuits PS1~PSn so as to supply the currents to the load more equally with the n current channels. For example, the present disclosure may be cooperates with the current channel balancing method disclosed in U.S. Pat. No. 6,414,470. That is, the total current detecting signal Icsum and the channel current detecting signals Iph1~Iphn generated according to the present disclosure associated with reference signals and periodical signals (e.g., ramp signals) may be used to generate pulse width modulated signals for the power stage circuits PS1~PSn.

In FIG. 4, the channel current balance circuit 115 comprises a resistor 510, a comparator circuit 530, and pulse width modulation signal generating circuits $550(1)$~$550(n)$. In this embodiment, the total current detecting signal Icsum flows through the resistor 510 to generate a voltage Vs. The comparator circuit 530 compares the voltage Vs and a reference voltage Vref to generate an error signal Vea. The pulse width modulation signal generating circuits $550(1)$~$550(n)$ respectively generate the control signals Cug1~Cugn and Clg1~Clgn according to the error signal Vea, the ramp signals Vramp, and the channel current detecting signals Iph1~Iphn. The control signals Cug1~Cugn and Clg1~Clgn are used to configure the upper transistors UG1~UGn and the lower transistors LG1~LGn of the power stage circuits PS1~PSn respectively through the pins Pug1~Pugn and Plg1~Plgn. In other embodiments, other algorithms may be utilized to generate the control signals Cug1~Cugn and Clg1~Clgn.

In the above embodiments, because the total current signal Isum continuously flows through the resistor RIMON, the temperature of the resistor RIMON may increase and accordingly the impedance of the resistor RIMON may vary. Errors may occur when generating the channel current detecting signals Iph~Iphn and the total current detecting signal Icsum according to the above equation derivations. In another embodiment, when the temperature of the resistor RIMON increases and the resistance of the resistor RIMON increases, a negative temperature coefficient thermistor Rntc may be coupled with the resistor RIMON in parallel, i.e., coupled between the pins Psum and Pimon. When the temperature of the resistor RIMON increases, the resistance of the negative temperature coefficient thermistor Rntc decreases so that the resistances of the resistor RIMON and the parallelly coupled negative temperature coefficient thermistor Rntc only slightly varies in a predetermined temperature range. The negative temperature coefficient thermistor Rntc coupled in parallel with the resistor RIMON may be easily realized, and the resistances of the resistor RIMON and the negative temperature coefficient thermistor Rntc may slightly vary in the required range (or does not vary).

In the above embodiments, the number of the current channels may be greater than or equal to 2, i.e., the multiphase DC-DC converting circuit 100 may be a 2-phase DC-DC converting circuit, a 3-phase DC-DC converting circuit, . . . or an n-phase DC-DC converting circuit. When the number of the current channels n is decided, one skilled in the art may easily modify the signal representation, the equations, the circuits and the function blocks according to the present disclose to achieve the same or similar functions. For example, when the number of the current channels is equal to 2, the 2-phase DC-DC converting circuit adopts two current detecting circuits CS1 and CS2.

In the above embodiments, some signals, circuits, and function blocks are shown only in the voltage form or in the current form for clearer explanation. In other embodiments, signals, circuits, and function blocks may be respectively expressed in the voltage form or in the current form. For example, in another embodiment, the channel current converting circuit 113 may receive the channel current detecting signals Vph1~Vphn and the output voltage Vout to generate the channel current detecting signals Iph1~Iphn in the voltage form. The channel current detecting signals in the voltage form are transmitted to the channel current balance circuit 115 for balancing the channel currents. In another embodiment, the transconductance amplifier circuits 220 and/or $310(1)$~$310(n)$ may be respectively realized with amplifiers with voltage inputs, current inputs, voltage outputs, and/or current outputs.

In the above embodiments, the control circuit 110 respectively configures the upper transistor UGk and the lower transistor LGk of the power stage circuit PSk with the control signals Uk and Lk (wherein k=1~n). In another embodiment, the control circuit 110 may generate only one control signal for each power stage circuit PSk, and configures the transistors UGk and LGk by the control signals generated by other signal processing circuits (wherein k=1~n). For example, the control circuit 110 may generate a control signals PWMn for configuring the upper transistor UGn of the power stage circuit PSn, and generate another control signal according to the control signal PWMn with an inverter circuit for configuring the lower transistor LGn.

In the above embodiments, by configuring DCRn/(rxn+ryn)=LXn/cxn*rxn*ryn=Kn, the current signal IRYn and the channel current detecting signal Vphn may be expressed by the current signal ILn of the nth current channel multiplied by a constant. Moreover, by configuring the resistances DCR1=DCR2 . . . =DCRn, the inductances LX1=LX2 . . . =LXn, the capacitances CX1=CX2 . . . =CXn, the resistances rx1=rx2 . . . =rxn, and the resistances ry1=ry2 . . . =ryn, the constants K1~Kn may be expressed by K1=K2 . . . =Kn=K. The total current signal Isum is equal to the summation of all the channel currents multiplied by the constant K. Therefore, the control circuit 110 may generate the channel current detecting signals Iph1~Iphn and the total current detecting signal Icsum according to the channel current detecting signals Vph1~Vphn and the total current signal Isum so as to perform the channel current balance operations. Furthermore, the resistances and/or the capacitances may be chosen flexibly and configured in the interior and/or the exterior of the control circuit 110 so that the design constraints may be relaxed. For example, the resistance of the resistor RYn may be configured in the integrated circuit of the control circuit 110 and coupled between the pins Psum and Pvphn.

In the above embodiments, each element may be configured in the interior and/or the exterior of the control circuit 110 according to different design considerations. For example, the resistor 510 may be configured in the interior and/or the exterior of the integrated circuit of the control circuit 110, and may be realized one or more circuit elements. The power stage circuits PS1~PSn may be configured in the interior and/or the exterior of the integrated circuit of the control circuit 110, and each of the power stage circuits PS1~PSn may comprise one or more upper transistors and one or more lower transistors.

In the above embodiments, the transconductances Gm220 and Gm310(1)~Gm310(n) may be configured to be greater than, smaller than, or equal to 1 according to the design considerations.

In the above embodiments, the channel current detecting signals are coupled with the inverting input of the transconductance amplifier circuit 220 so that the total current detecting signal Icsum may be generated through the resistor RIMON and the feedback path of the transconductance amplifier circuit 220. The circuit elements may be configured in the interior and/or exterior of the control circuit according to different design considerations. Thus, the circuit architecture of the multiphase DC-DC converting circuit 100 and the selection of the circuit elements are more flexible.

In the above embodiments, a negative temperature coefficient thermistor may be coupled with the resistor RIMON in parallel to perform the temperature compensation function. The influence of the resistance of the resistor RIMON varying with the temperature may therefore be reduced. The temperature compensation mechanism is accurate, and the circuit architecture is very simple.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to" Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multiphase DC-DC converting circuit for providing power to a load, comprising:
    a plurality of power stage circuits, each of which comprises an upper transistor, a lower transistor, and an output for coupling with the load through an inductor;
    a first transconductance amplifier circuit, comprising a non-inverting input and an inverting input respectively coupled with two terminals of a detecting resistor;
    a comparator circuit, comprising a non-inverting input for coupling with the load, an inverting input coupled with the non-inverting input of the first transconductance amplifier circuit, and an output coupled with the inverting input of the first transconductance amplifier circuit;
    a plurality of current detecting circuits, each of which comprises a first resistor, a second resistor and a capacitor, wherein a first terminal of the first resistor is coupled with the output of one of the power stage circuits, a second terminal of the first resistor is coupled with a first terminal of the capacitor and a first terminal of the second resistor, a second terminal of the capacitor is used for coupling with the load, and a second terminal of the second resistor is coupled with the inverting input of the comparator circuit;
    a plurality of channel current converting circuits, each of which comprises an input for coupling with the load, the second terminal of the first resistor of one of the current detecting circuits, the first terminal of the capacitor of one of the current detecting circuits, and the first terminal of the second resistor of one of the current detecting circuits; and
    a channel current balance circuit, comprising an input coupled with an output of the first transconductance amplifier circuit and outputs of the channel current converting circuits, and comprising an output coupled with the power stage circuits for configuring the upper transistors and the lower transistors of the coupled power stage circuits.

2. The multiphase DC-DC converting circuit of claim 1, wherein resistances of the first resistors of the current detecting circuits are substantially equal, resistances of the second resistors of the current detecting circuits are substantially equal, capacitances of the capacitors of the current detecting circuits are substantially equal, and inductances of the inductors respectively coupled with the power stage circuits are substantially equal.

3. The multiphase DC-DC converting circuit of claim 2, further comprising:
    a negative temperature coefficient thermistor, coupled with the detecting resistor in parallel, and coupled between the non-inverting input and the inverting input of the first transconductance amplifier circuit.

4. The multiphase DC-DC converting circuit of claim 2, wherein each of the channel current converting circuit comprises a second transconductance amplifier circuit, which comprises a first input for coupling with the load, comprises a second input coupled with the second terminal of the first resistor of one of the current detecting circuits, the first terminal of the capacitor of one of the current detecting circuits, and the first terminal of the second resistor of one of the current detecting circuits, and comprises an output coupled with the input of the channel current balance circuit.

5. The multiphase DC-DC converting circuit of claim 2, wherein the channel current balance circuit comprises a plurality of pulse width modulated signal generating circuits, each of which comprises an output for coupling with one of the power stage circuits for configuring the upper transistors and the lower transistors of the coupled power stage circuit.

6. The multiphase DC-DC converting circuit of claim 1, further comprising:
a negative temperature coefficient thermistor, coupled with the detecting resistor in parallel, and coupled between the non-inverting input and the inverting input of the first transconductance amplifier circuit.

7. The multiphase DC-DC converting circuit of claim 1, wherein each of the channel current converting circuit comprises a second transconductance amplifier circuit, which comprises a first input for coupling with the load, comprises a second input coupled with the second terminal of the first resistor of one of the current detecting circuits, the first terminal of the capacitor of one of the current detecting circuits, and the first terminal of the second resistor of one of the current detecting circuits, and comprises an output coupled with the input of the channel current balance circuit.

8. The multiphase DC-DC converting circuit of claim 1, wherein the channel current balance circuit comprises a plurality of pulse width modulated signal generating circuits, each of which comprises an output for coupling with one of the power stage circuits for configuring the upper transistors and the lower transistors of the coupled power stage circuit.

9. A control circuit of a multiphase DC-DC converting circuit for configuring the multiphase DC-DC converting circuit to provide power to a load; wherein the multiphase DC-DC converting circuit comprises a detecting resistor, a plurality of power stage circuits and a plurality of current detecting circuits; each of the power stage circuits comprises an output for coupling with the load through an inductor; each of the current detecting circuits comprises a first resistor, a second resistor and a capacitor, wherein a first terminal of the first resistor is coupled with the output of one of the power stage circuits, a second terminal of the first resistor is coupled with a first terminal of the capacitor and a first terminal of the second resistor, a second terminal of the capacitor is used for coupling with the load, and a second terminal of the second resistor is coupled with the control circuit; the control circuit comprising:
a first transconductance amplifier circuit, comprising a non-inverting input, an inverting input, and an output;
a comparator circuit, comprising a non-inverting input for coupling with the load, an inverting input coupled with the non-inverting input of the first transconductance amplifier circuit and the second terminal of the second resistors of the current detecting circuits, and an output coupled with the inverting input of the first transconductance amplifier circuit;
a plurality of channel current converting circuits, each of which comprises an input for coupling with the load, the second terminal of the first resistor of one of the current detecting circuits, the first terminal of the capacitor of one of the current detecting circuits, and the first terminal of the second resistor of one of the current detecting circuits; and
a channel current balance circuit, comprising an input coupled with the output of the first transconductance amplifier circuit and outputs of the channel current converting circuits, and comprising an output coupled with the power stage circuits for configuring the power stage circuits;
wherein two terminals of the detecting resistor are respectively coupled with the non-inverting input and the inverting input of the first transconductance amplifier circuit.

10. The control circuit of claim 9, wherein the multiphase DC-DC converting circuit further comprises:
a negative temperature coefficient thermistor, coupled with the detecting resistor in parallel, and comprising two terminals respectively coupled with the non-inverting input and the inverting input of the first transconductance amplifier circuit.

11. The control circuit of claim 10, wherein each of the channel current converting circuit comprises a second transconductance amplifier circuit, which comprises a first input for coupling with the load, comprises a second input coupled with the second terminal of the first resistor of one of the current detecting circuits, the first terminal of the capacitor of one of the current detecting circuits, and the first terminal of the second resistor of one of the current detecting circuits, and comprises an output coupled with the input of the channel current balance circuit.

12. The control circuit of claim 10, wherein the channel current balance circuit comprises a plurality of pulse width modulated signal generating circuits, each of which comprises an output for coupling with and configuring one of the power stage circuits.

13. The control circuit of claim 10, wherein each of the power stage circuits of the multiphase DC-DC converting circuit comprises an upper transistor and a lower transistor; and the channel current balance circuit comprises a plurality of pulse width modulated signal generating circuits, each of which comprises an output coupled with one of the power stage circuits for configuring the upper transistors and the lower transistors of the coupled power stage circuits.

14. The control circuit of claim 9, wherein each of the channel current converting circuit comprises a second transconductance amplifier circuit, which comprises a first input for coupling with the load, comprises a second input coupled with the second terminal of the first resistor of one of the current detecting circuits, the first terminal of the capacitor of one of the current detecting circuits, and the first terminal of the second resistor of one of the current detecting circuits, and comprises an output coupled with the input of the channel current balance circuit.

15. The control circuit of claim 9, wherein the channel current balance circuit comprises a plurality of pulse width modulated signal generating circuits, each of which comprises an output for coupling with and configuring one of the power stage circuits.

16. The control circuit of claim 9, wherein each of the power stage circuits of the multiphase DC-DC converting circuit comprises an upper transistor and a lower transistor; and the channel current balance circuit comprises a plurality of pulse width modulated signal generating circuits, each of which comprises an output coupled with one of the power stage circuits for configuring the upper transistors and the lower transistors of the coupled power stage circuits.

* * * * *